(12) United States Patent
Zhou et al.

(10) Patent No.: US 11,256,008 B2
(45) Date of Patent: Feb. 22, 2022

(54) LASER PROTECTIVE FILM AND LASER PROTECTIVE DEVICE COMPRISING THE SAME

(71) Applicants: South China Normal University, Guangzhou (CN); Shenzhen Guohua Optoelectronics Co., Ltd., Shenzhen (CN); Academy of Shenzhen Guohua Optoelectronics, Shenzhen (CN)

(72) Inventors: Guofu Zhou, Guangzhou (CN); Xiaowen Hu, Guangzhou (CN); Wei Zhao, Guangzhou (CN); Qiumei Nie, Guangzhou (CN); Weijie Zeng, Guangzhou (CN); Haitao Sun, Guangzhou (CN)

(73) Assignees: SOUTH CHINA NORMAL UNIVERSITY ELECTRONIC PAPER DISPLAY INSTITUTE, Guangzhou (CN); SHENZHEN GUOHUA OPTOELECTRONICS CO., LTD., Shenzhen (CN); ACADEMY OF SHENZHEN GUOHUA OPTOELECTRONICS, Shenzhen (CN)

(*) Notice: Subject to any disclaimer, the term of this patent is extended or adjusted under 35 U.S.C. 154(b) by 360 days.

(21) Appl. No.: 16/498,760

(22) PCT Filed: Oct. 10, 2018

(86) PCT No.: PCT/CN2018/109636
§ 371 (c)(1),
(2) Date: Sep. 27, 2019

(87) PCT Pub. No.: WO2019/223213
PCT Pub. Date: Nov. 28, 2019

(65) Prior Publication Data
US 2020/0333514 A1 Oct. 22, 2020

(30) Foreign Application Priority Data

May 25, 2018 (CN) .......................... 201810517446.X

(51) Int. Cl.
*G02B 5/08* (2006.01)
*G02B 5/00* (2006.01)

(52) U.S. Cl.
CPC ........... *G02B 5/0841* (2013.01); *G02B 5/003* (2013.01)

(58) Field of Classification Search
CPC ... G02B 5/0841; G02B 5/003; G02F 1/13718; G02F 1/13737; G02F 1/1396; G02F 1/13775
See application file for complete search history.

(56) References Cited

U.S. PATENT DOCUMENTS

| 5,877,826 A | 3/1999 | Yang et al. |
| 2004/0012836 A1 | 1/2004 | Li |
| 2017/0153495 A1* | 6/2017 | Wei .................. G02F 1/133533 |

FOREIGN PATENT DOCUMENTS

| CN | 102591058 A | 7/2014 |
| CN | 105093649 A | 11/2015 |

(Continued)

*Primary Examiner* — Donald L Raleigh
(74) *Attorney, Agent, or Firm* — Gottlieb, Rackman & Reisman, P.C.

(57) ABSTRACT

Disclosed are a laser protective film and a laser protective device comprising the same. The laser protective film comprises, stackingly disposed: a first liquid crystal polymer layer for reflecting left-hand polarized light, a second liquid crystal polymer layer for reflecting right-hand polarized light, and a third liquid crystal polymer layer for absorbing incident laser. In the above way, the laser protective film of the present disclosure has a large angle of protection, high flexibility. In addition, it is easy to find any damage to the laser protective film of the present disclosure. Moreover, it (Continued)

can make modification to existing equipment. Thus, the present disclosure has a good application prospect in many fields such as laser goggles, window glass and the like.

10 Claims, 1 Drawing Sheet

(56) References Cited

FOREIGN PATENT DOCUMENTS

| | | | |
|---|---|---|---|
| CN | 106773433 | A | 5/2017 |
| CN | 107346084 | A | 11/2017 |
| JP | 4280246 | B2 | 6/2009 |

\* cited by examiner

LASER PROTECTIVE FILM AND LASER PROTECTIVE DEVICE COMPRISING THE SAME

CROSS-REFERENCE TO RELATED APPLICATIONS

This application is the United States National Stage entry under 35 U.S.C. 371 of PCT/CN2018/109636, filed on Oct. 10, 2018, which in turn claims the priority of Chinese patent application No. 201810517446.X "LASER PROTECTIVE FILM AND LASER PROTECTIVE DEVICE COMPRISING THE SAME", filed on May 25, 2018, both of which are hereby incorporated by reference in their entirety.

TECHNICAL FIELD

The present disclosure relates to the technical field of materials for optical films, particularly to a laser protective film and a laser protective device comprising the same.

BACKGROUND

Laser has properties such as high optical power density and good collimation, and may cause damage to eyes and precision optical equipment. For a long time, laser was generally used in special environments such as laboratories and factories, and thus has little impact on the safety of public environment. However, it is easier to obtain various mini-laser devices at present. The influence of laser on the safety of public environment, such as traffic safety, is receiving more and more attention.

By now, many types, such as absorbing-, reflecting-, nonlinear-absorbing- and optical-multiplexing types, of laser protective devices have been developed and applied. However, these devices still have many defects, such as complicated manufacturing process, limited protection angle, inability to perform refit on the basis of existing equipment and the like.

SUMMARY

In order to solve at least one of the above technical problems, the present disclosure provides a laser protective film and a laser protective device comprising the same. The laser protective film of the present disclosure has a large protective angle and high flexibility. It is easy to find a damage to the laser protective film. Moreover, it can make modification to existing equipment. Therefore, the laser protective film and the laser protective device comprising the same of the present disclosure have a good application prospect in many technical fields such as laser goggles, window glass and the like.

The technical solutions adopted by the present disclosure are as follows.

According to one aspect of the present disclosure, a laser protective film is provided. The laser protective film may comprise, stackingly disposed, a first liquid crystal polymer layer for reflecting left-hand polarized light, a second liquid crystal polymer layer for reflecting right-hand polarized light, and a third liquid crystal polymer layer for absorbing incident laser. In the present disclosure, there is no limitation to the stacking order of the first liquid crystal polymer layer, the second liquid crystal polymer layer and the third liquid crystal polymer layer. The third liquid crystal polymer layer may be disposed as an intermediate layer, or as a top layer acting as a layer which is directly irradiated by laser, or as a bottom layer. The third liquid crystal polymer layer may be usually disposed on the top layer or on the bottom layer, in order to facilitate the processing procedure.

Preferably, the molecules of the first polymer layer may be arranged in a left-handed spiral structure, the molecules of the second liquid crystal polymer layer may be arranged in a right-handed spiral structure, and the arrangement of the molecules of the third liquid crystal polymer layer may be not parallel to those of the first liquid crystal polymer layer and the second liquid crystal polymer layer. More preferably, the arrangement of the molecules of the third liquid crystal polymer layer may be perpendicular to those of the first liquid crystal polymer layer and the second liquid crystal polymer layer.

Preferably, the first liquid crystal polymer layer may be formed by the polymerization of a mixture A which may include a polymerizable liquid crystal monomer, a photoinitiator and a polymerization inhibitor, under UV-irradiation. The polymerizable liquid crystal monomer of the mixture A may include a left-handed chiral liquid crystal monomer. Optionally, the mixture A may further include a left-handed chiral dopant.

In addition, the second liquid crystal polymer layer may be formed by the polymerization of a mixture B which may include a polymerizable liquid crystal monomer, a photoinitiator and a polymerization inhibitor, under UV-irradiation. The polymerizable liquid crystal monomer of the mixture B may include a right-handed chiral liquid crystal monomer. Optionally, the mixture B may further include a right-handed chiral dopant.

The third liquid crystal polymer layer may be formed by the polymerization of a mixture C which may include a polymerizable liquid crystal monomer, a photoinitiator, a polymerization inhibitor and a negative dichroic dye, under UV-irradiation.

More preferably, the mixture A may include 65 to 93.5 parts by mass of the polymerizable liquid crystal monomer, 0.5 to 3 parts by mass of the photoinitiator, and 0.005 to 2 parts by mass of the polymerization inhibitor. The polymerizable liquid crystal monomer of the mixture A may include 6 to 30 parts by mass of the left-handed chiral liquid crystal monomer. Optionally, the mixture A may further include 6 to 30 parts by mass of the left-handed chiral dopant.

The mixture B may include 65 to 93.5 parts by mass of the polymerizable liquid crystal monomer, 0.5 to 3 parts by mass of the photoinitiator, and 0.005 to 2 parts by mass of the polymerization inhibitor. The polymerizable liquid crystal monomer of the mixture B may include 6 to 30 parts by mass of the right-handed chiral liquid crystal monomer. Optionally, the mixture B may further include 6 to 30 parts by mass of right-handed chiral dopant;

The mixture C may include 92 to 99 parts by mass of the polymerizable liquid crystal monomer, 0.5 to 3 parts by mass of the photoinitiator, 0.005 to 2 parts by mass of the polymerization inhibitor, and 0.5 to 3 parts by mass of the negative dichroic dye.

Preferably, the absorption band of the third liquid crystal polymer layer may be the same as the reflection bands of the first and second liquid crystal polymer layers, thereby increasing the protection angles of the first and second liquid crystal polymer layers for laser.

More preferably, the polymerizable liquid crystal monomer may include at least one selected from a group consisting of HCM008, HCM009, HCM020 and HCM021.

More preferably, the left-handed chiral dopant may include at least one selected from a group consisting of S1011, S811, S5011 and S6N. The right-handed chiral dopant may include at least one selected from a group consisting of R1011, R811, CB15, R5011 and R6N. The right-handed chiral liquid crystal monomer may include HCM-006.

More preferably, the photoinitiator may include at least one selected from a group consisting of Irgacure-819, Irgacure-651, and Irgacure-369 The polymerization inhibitor may include at least one selected from a group consisting of Tinuvin 328 and O-methylhydroquinone.

More preferably, the negative dichroic dye may include at least one selected from a group consisting of RL002, RL013, and RL014.

Further preferably, the first liquid crystal polymer layer may have a thickness of 5 to 50 µm. The second liquid crystal polymer layer may have a thickness of 5 to 50 µm. The third liquid crystal polymer layer may have a thickness of 5 to 50 µm.

According to another aspect of the present disclosure, the method for preparing the above laser protective film may include the following steps:

1) taking raw materials to prepare the mixture A, the mixture B and the mixture C in a yellow light environment;

2) preparing the third liquid crystal polymer layer for absorbing an incident laser, in which, specifically, a liquid crystal cell may be selected or manufactured first, and may include a first light-transmitting substrate and a second light-transmitting substrate which are disposed oppositely, and the opposite surfaces of the first and second light-transmitting substrates are spin-coated with an alignment layer so as to form the liquid crystal cell having an accommodation space; and then, the mixture C may be filled into the accommodation space of the liquid crystal cell, and polymerize to form the third liquid crystal polymer layer under UV-irradiation;

3) disposing, on the third liquid crystal polymer layer, the first liquid crystal polymer layer for reflecting the left-hand polarized light and the second liquid crystal polymer layer for reflecting the right-hand polarized light; in which, the first and second liquid crystal polymer layers may be formed by blade-coating the mixtures A and B respectively, followed by the polymerization thereof under UV-irradiation.

The first and second liquid crystal polymer layers may be disposed on the same side or on different sides of the third liquid crystal polymer layer. If the first and second liquid crystal polymer layers are disposed on the same side of the third liquid crystal polymer layer, the first or second liquid crystal polymer layer would be disposed as an intermediate layer. Further, in practical applications, the third liquid crystal polymer layer or another outer layer would be selected as a layer which is directly irradiated by laser, depending on specific conditions. If the first and second liquid crystal polymer layers are disposed on both sides of the third liquid crystal polymer layer respectively, (i.e., the third liquid crystal polymer layer is used as the intermediate layer), in practical applications, the first or second liquid crystal polymer layer would be selected as a layer which is directly irradiated by laser, depending on specific conditions.

The molecules of liquid crystal macromolecular polymers are arranged in a cholesteric structure which can reflect circularly polarized light. The cholesteric crystal structure includes left- and right-handed spiral structures. Crystal having a left-handed spiral structure can reflect left-hand polarized light, and crystal having a right-handed spiral structure can reflect right-hand polarized light. On this basis, the complete reflection of the circularly polarized light can be achieved by combining the crystal have a left-handed spiral structure and the crystal having a right-handed spiral structure. However, the reflection of the cholesteric crystal structure for the circularly polarized light is related to the incident angle of incident light. When the incident angle is relatively large, the cholesteric crystal structure cannot effectively reflect the circularly polarized light. Thus, the laser protective film of the present disclosure is provided with a first liquid crystal polymer layer for reflecting left-hand polarized light and a second liquid crystal polymer layer for reflecting right-hand polarized light, and further provided with a third liquid crystal polymer layer for absorbing incident laser to expand the angle of protection.

In particular, when the incident angle of laser is less than 90°, the laser absorption intensity of the negative dichroic dye of the third liquid crystal polymer layer can increase with the increase of the incident angle of the laser. When the incident angle of laser reaches 90°, the laser absorption intensity would reach the maximum. Thus, the third liquid crystal polymer layer doped with the negative dichroic dye can effectively expand the protection angle for laser.

Further, the first, second and third liquid crystal polymer layers of the laser protective film of the present disclosure are all liquid crystal polymer layers, such that the resulted laser protective film has better flexibility and is easy to find possible damages to the layers.

In addition, the laser protective film of the present disclosure can be used to modify existing devices, so that the existing devices can be protected from laser damage and have other properties. Accordingly, the present disclosure further provides a laser protective device comprising any one of the above laser protective films.

The present disclosure can have the following advantages.

The present disclosure provides a laser protective film and a laser protective device comprising the same.

The laser protective film includes, stackingly disposed, a first liquid crystal polymer layer for reflecting left-hand polarized light, a second liquid crystal polymer layer for reflecting right-hand polarized light, and a third liquid crystal polymer layer for absorbing incident laser.

In the above way, the laser protective film of the present disclosure has a large angle of protection and high flexibility. Any damage to the laser protective film can be easily found. Moreover, it can make modification to the existing equipment. Thus, the present disclosure has a good application prospect in many technical fields such as laser goggles, vehicle window glass and the like.

BRIEF DESCRIPTION OF THE DRAWINGS

In order to illustrate the technical solutions of the embodiments of the present disclosure more clearly, the drawings to be used in the description of the embodiments will be briefly described below, in which.

DETAILED DESCRIPTION

Figure 1:
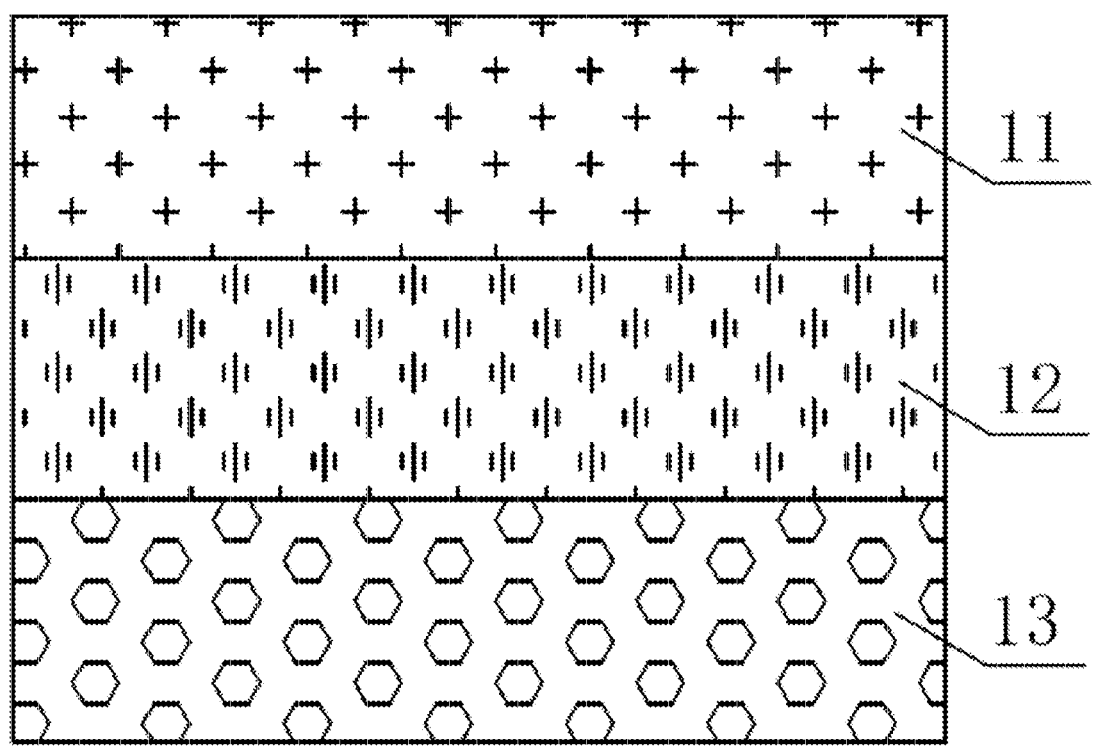
FIG. 1 is a structural schematic diagram of a laser protective film according to one embodiment of the present disclosure.

Hereinafter, the present disclosure would be further illustrated with reference to specific embodiments. It should be understood that these examples are for illustrative purposes only and are not intended to limit the scope of the invention. In addition, it should be understood that various changes or modifications can be made by those skilled in the art after reading the teachings of the present disclosure, and those equivalent forms also fall within the scope defined by the claims appended hereto.

Example 1

In a yellow light environment, 15 parts by mass of a polymerizable liquid crystal monomer HCM008, 60 parts by mass of a polymerizable liquid crystal monomer HCM009, 14.32 parts by mass of a polymerizable liquid crystal monomer HCM020, 8.83 parts by mass of a left-handed chiral dopant S1011, 1.85 parts by mass of a photoinitiator Irgacure-819 and 0.01 part by mass of a polymerization inhibitor Tinuvin 328 were taken and put in a brown bottle. 4 mL of dichloromethane was added and stirred at room temperature for 30 min, and then heated at 80° C. for 3 h to completely evaporate dichloromethane, resulting in a mixture A.

In a yellow light environment, 15 parts by mass of a polymerizable liquid crystal monomer HCM008, 60 parts by mass of a polymerizable liquid crystal monomer HCM009, 18.4 parts by mass of a polymerizable liquid crystal monomer HCM020, 4.6 parts by mass of a right-handed chiral liquid crystal monomer HCM006, 2 parts by mass of a photoinitiator Irgacure-819 and 0.01 part by mass of a polymerization inhibitor Tinuvin 328 were taken and put in a brown bottle. 4 mL of dichloromethane was added and stirred at room temperature for 30 min, and then heated at 80° C. for 3 h to completely evaporate dichloromethane, resulting in a mixture B.

In a yellow light environment, 15 parts by mass of a polymerizable liquid crystal monomer HCM008, 60 parts by mass of a polymerizable liquid crystal monomer HCM009, 18.4 parts by mass of a polymerizable liquid crystal monomer HCM020, 2 parts by mass of a photoinitiator Irgacure-819, 1.5 parts by mass of a negative dichroic dye RL-013, 0.01 part by mass of a polymerization inhibitor Tinuvin 328 were taken and put in a brown bottle. 4 mL of dichloromethane was added and stirred at room temperature for 30 min, and then heated at 80° C. for 3 h to completely evaporate dichloromethane, resulting in a mixture C.

For the above compounds, the polymerizable liquid crystal monomer HCM008 (purchased from Jiangsu China Hecheng Display Technology Co., Ltd.) had a structural formula of

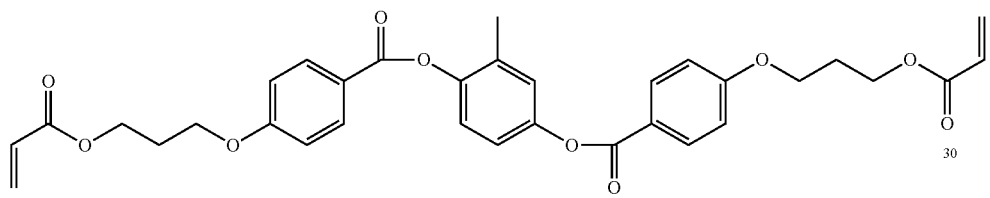 [SMILES: C=CC(=O)OCCCOc1ccc(C(=O)Oc2ccc(OC(=O)c3ccc(OCCCOC(=O)C=C)cc3)c(C)c2)cc1]

The polymerizable liquid crystal monomer HCM009 (purchased from Jiangsu China Hecheng Display Technology Co., Ltd.) had a structural formula of

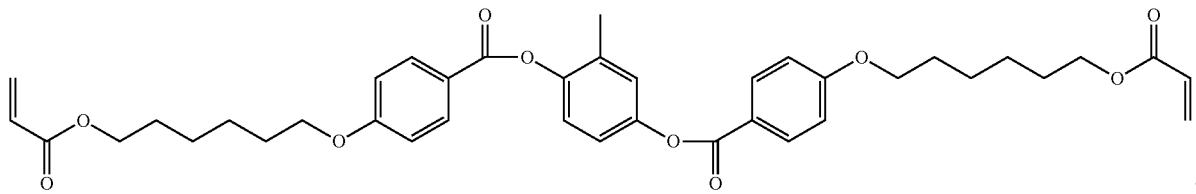 [SMILES: C=CC(=O)OCCCCCCOc1ccc(C(=O)Oc2ccc(OC(=O)c3ccc(OCCCCCCOC(=O)C=C)cc3)c(C)c2)cc1]

The polymerizable liquid crystal monomer HCM020 (purchased from Jiangsu China Hecheng Display Technology Co., Ltd.) had a structural formula of

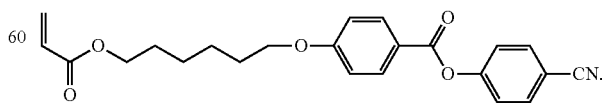

The left-handed chiral dopant S1011 (purchased from Beijing Bayi Space LCD Technology Co., Ltd.) had a structural formula of

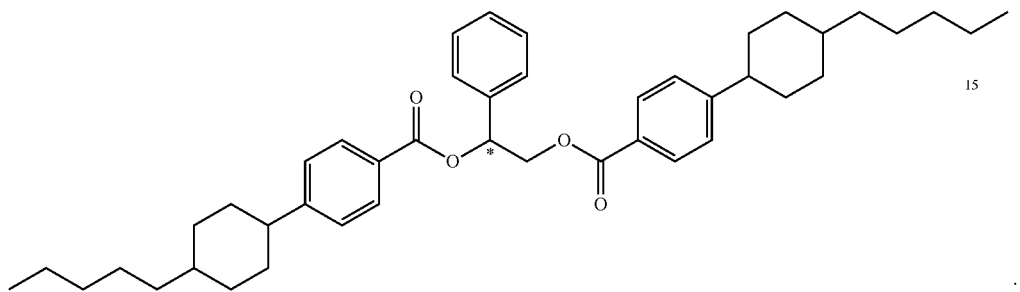 [SMILES: CCCCCC1CCC(c2ccc(C(=O)OCC(OC(=O)c3ccc(C4CCC(CCCCC)CC4)cc3)c3ccccc3)cc2)CC1]

The right-handed chiral liquid crystal monomer HCM-006 (purchased from Jiangsu China Hecheng Display Technology Co., Ltd.) had a structural formula of

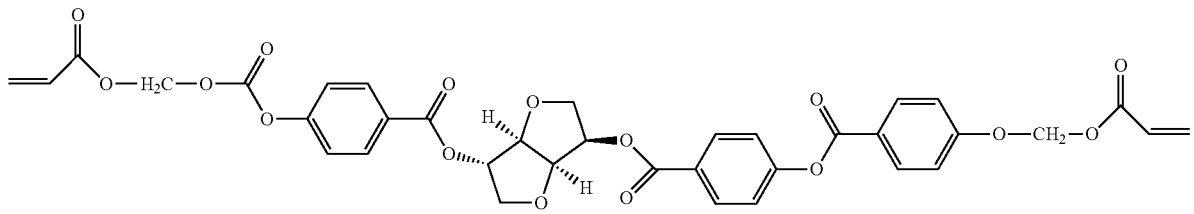 [SMILES: C=CC(=O)OCOC(=O)Oc1ccc(C(=O)O[C@H]2CO[C@H]3[C@@H]2OC[C@H]3OC(=O)c2ccc(OC(=O)c3ccc(OCOC(=O)C=C)cc3)cc2)cc1]

The initiator Irgacure-819 (purchased from HEOWNS) had a structural formula of

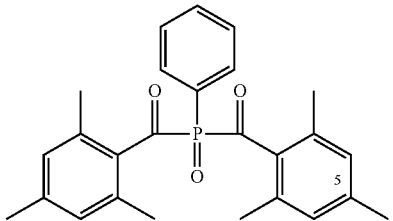

The polymerization inhibitor Tinuvin 328 (purchased from HEOWNS) had a structural

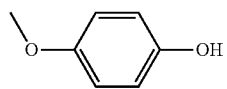

formula of

The preparation process specifically included the following steps.

The third liquid crystal polymer layer for absorbing incident laser was prepared in a yellow light environment. Specifically, a liquid crystal cell was disposed first, which comprised the following steps:

taking a first light-transmitting substrate and a second light-transmitting substrate, and disposing the first and second light-transmitting substrates in parallel;

spin-coating the opposite surfaces of the first and second light-transmitting substrates with a vertical alignment layer to form the liquid crystal cell having an accommodation space;

filling the mixture C into the accommodation space of the liquid crystal cell; and illuminating with ultraviolet light to facilitate the polymerization to form the third liquid crystal polymer layer.

With the induction of the alignment layer, the molecules of the third liquid crystal polymer layer were arranged perpendicularly to those of the first and second light-transmitting substrates.

Then, the third liquid crystal polymer layer was sequentially provided with the second liquid crystal polymer layer for reflecting the left-hand polarized light and the first liquid crystal polymer layer for reflecting the right-hand polarized light. Specifically, the third liquid crystal polymer layer was heated to 80° C., and then, on the surface of the third liquid crystal polymer layer, was bladed-coated with the mixture B by means of a blade-coating bar. The coated mixture B had a thickness of 25 µm. After cooling to 40° C., the mixture B was cured for 15 min by means of a UV light source of 200 W, to form the second liquid crystal polymer layer.

Then, the second liquid crystal polymer layer was heated to 80° C., and, on the surface of the second liquid crystal polymer layer away from the third liquid crystal polymer layer, was bladed-coated with the mixture A. The coated mixture A had a thickness of 25 µm. After cooling to 40° C., the mixture A was cured for 15 min by means of a UV light source of 200 W, to form the first liquid crystal polymer layer.

Through the above preparation process, the laser protective film was prepared and had specific structure as shown in FIG. 1.

FIG. 1 is a structural schematic diagram of a laser protective film according to one embodiment of the present disclosure. The laser protective film of this example was prepared by the above process. As shown in FIG. 1, the laser protective film of the present embodiment includes, from top to bottom, the first liquid crystal polymer layer 11, the second liquid crystal polymer layer 12 and the third liquid crystal polymer layer 13 which are stacked sequentially. Under laser irradiation, the first liquid crystal polymer layer 11 can reflect the left-hand polarized light, the second liquid crystal polymer layer 12 can reflect the right-hand polarized light, and the third liquid crystal polymer layer 13 can absorb laser which is not reflected due to too large incident angle, thereby realizing the reflection and absorption of laser. Meanwhile, the light absorption coefficient of the negative dichroic dye in the third liquid crystal polymer layer 13 was related to the incident angle of the incident light. The absorption coefficient for light would be the maximum when the incident direction of the incident light was perpendicular to the long axis of the molecules of the negative dichroic dye. Of course, in practical applications, the third liquid crystal polymer layer 13 may also be used as a layer which is directly irradiated by laser, depending on specific conditions.

Example 2

In a yellow light environment, 67 parts by mass of a polymerizable liquid crystal monomer HCM009, 18 parts by mass of a left-handed chiral dopant S1011, 12 parts by mass of a left-handed chiral dopant 5811, 1.7 parts by mass of a photoinitiator Irgacure-819, 1.3 parts by mass of a photoinitiator Irgacure 369, 1.2 parts by mass of a polymerization inhibitor Tinuvin 328, and 0.8 part by mass of a polymerization inhibitor O-methylhydroquinone were taken and put in a brown bottle. 4 mL of dichloromethane was added and stirred at room temperature for 30 min, and then heated at 80° C. for 3 h to completely evaporate dichloromethane, resulting in a mixture A. The mixture A was used for preparing a first liquid crystal polymer layer for reflecting left-hand polarized light.

In a yellow light environment, 67 parts by mass of a polymerizable liquid crystal monomer HCM009, 18 parts by mass of a right-handed chiral dopant R 1011, 12 parts by mass of a right-handed chiral dopant R811, 1.7 parts by mass of a photoinitiator Irgacure-819, 1.8 parts by mass of a photoinitiator Irgacure-651, 1.5 parts by mass of a polymerization inhibitor Tinuvin 328, and 0.5 part by mass of a polymerization inhibitor O-methylhydroquinone were taken and put in a brown bottle. 4 mL of dichloromethane was added and stirred at room temperature for 30 min, and then heated at 80° C. for 3 h to completely evaporate dichloromethane, resulting in a mixture B. The mixture B was used for preparing a second liquid crystal polymer layer for reflecting right-hand polarized light.

In a yellow light environment, 94 parts by mass of a polymerizable liquid crystal monomer HCM009, 3 parts by mass of a photoinitiator Irgacure-819, 1.2 parts by mass of a negative dichroic dye RL002, 1.8 parts by mass of a negative dichroic dye RL014, 1.5 parts by mass of a polymerization inhibitor Tinuvin 328, and 0.5 part by mass of a polymerization inhibitor O-methylhydroquinone were taken and put in a brown bottle. 4 mL of dichloromethane was added and stirred at room temperature for 30 min, and then heated at 80° C. for 3 h to completely evaporate dichloromethane, resulting in a mixture C. The mixture C was used for preparing a third liquid crystal polymer layer for absorbing incident laser.

The subsequent preparation procedure was substantially the same as that of Example 1, except for the followings. In this example, when preparing the third liquid crystal polymer layer, the first and second light-transmitting substrates in the liquid crystal cell were disposed in parallel with each other. The alignment layer disposed between the first and second light-transmitting substrates had an angle of 30° with respect to the first light-transmitting substrate. When preparing the first and second liquid crystal polymer layers, the mixture A was blade-coated on the surface of the third liquid crystal polymer layer to prepare the first liquid crystal polymer layer, and then the mixture B was bladed-coated on the surface of the first liquid crystal polymer layer away from the third liquid crystal polymer layer to prepare the second liquid crystal polymer layer. The first, second and third liquid crystal polymer layers all had thickness of 5 μm. The resulted laser protective film included the second liquid crystal polymer layer for reflecting right-hand polarized light, the first liquid crystal polymer layer for reflecting left-hand polarized light and the third liquid crystal polymer layer for absorbing incident laser, which were stacked sequentially. In practical applications, the second or third liquid crystal polymer layer may be used as a layer which is directly irradiated by laser, depending on specific conditions.

Example 3

In a yellow light environment, 36 parts by mass of a polymerizable liquid crystal monomer HCM008, 42 parts by mass of a polymerizable liquid crystal monomer HCM021, 12 parts by mass of a left-handed chiral dopant 55011, 8 parts by mass of a left-handed chiral dopant S6N, 2.2 parts by mass of a photoinitiator Irgacure-369, 1 part by mass of a polymerization inhibitor O-methylhydroquinone were taken and put in a brown bottle. 4 mL of dichloromethane was added and stirred at room temperature for 30 min, and then heated at 80° C. for 3 h to completely evaporate dichloromethane, resulting in a mixture A. The mixture A was used for preparing a first liquid crystal polymer layer for reflecting left-hand polarized light.

In a yellow light environment, 33 parts by mass of a polymerizable liquid crystal monomer HCM008, 45 parts by mass of a polymerizable liquid crystal monomer HCM021, 12 parts by mass of a right-handed chiral dopant R5011, 8 parts by mass of a right-handed chiral dopant R6N, 2 parts by mass of a photoinitiator Irgacure-369, 1 part by mass of a polymerization inhibitor O-methylhydroquinone were taken and put in a brown bottle. 4 mL of dichloromethane was added and stirred at room temperature for 30 min, and then heated at 80° C. for 3 h to completely evaporate dichloromethane, resulting in a mixture B. The mixture B was used for preparing a second liquid crystal polymer layer for reflecting right-hand polarized light.

In a yellow light environment, 46 parts by mass of a polymerizable liquid crystal monomer HCM008, 50 parts by mass of a polymerizable liquid crystal monomer HCM021, 1.8 parts by mass of a photoinitiator Irgacure-369, 2.2 parts by mass of a negative dichroic dye RL014, and 1 part by mass of a polymerization inhibitor O-methylhydroquinone were taken and put in a brown bottle. 4 mL of dichloromethane was added and stirred at room temperature for 30 min, and then heated at 80° C. for 3 h to completely evaporate dichloromethane, resulting in a mixture C. The mixture C was used for preparing a third liquid crystal polymer layer for absorbing incident laser.

The subsequent preparation procedure was substantially the same as that of Example 1, except for the followings. In this example, when preparing the third liquid crystal polymer layer, the first and second light-transmitting substrates in the liquid crystal cell were disposed in parallel with each other. The alignment layer disposed between the first and second light-transmitting substrates had an angle of 60° with respect to the first light-transmitting substrate. In addition, the first and second liquid crystal polymer layers were disposed on both sides of the third liquid crystal polymer layer respectively. The mixture A was blade-coated on the surface of the third liquid crystal polymer layer to prepare the first liquid crystal polymer layer, and then the mixture B was blade-coated on the surface of the third liquid crystal polymer layer away from the first liquid crystal polymer layer to prepare the second liquid crystal polymer layer. The first liquid crystal polymer layer had a thickness of 10 μm, the second liquid crystal polymer layer had a thickness of 15 μm, and the third liquid crystal polymer layer had a thickness of 20 μm. The resulted laser protective film included the first liquid crystal polymer layer for reflecting left-hand polarized light, the third liquid crystal polymer layer for absorbing incident laser and the second liquid crystal polymer layer for reflecting right-hand polarized light, which were stacked. In practical applications, the first or second liquid crystal polymer layer may be used as a layer which is directly irradiated by laser, depending on specific conditions.

Example 4

In a yellow light environment, 12 parts by mass of a polymerizable liquid crystal monomer HCM009, 56 parts by mass of a polymerizable liquid crystal monomer HCM008, 25.5 parts by mass of a polymerizable liquid crystal monomer HCM021, 6 parts by mass of a left-handed chiral dopant 5811, 0.5 part by mass of a photoinitiator Irgacure-651, and 0.005 part by mass of a polymerization inhibitor O-methylhydroquinone were taken and put in a brown bottle. 4 mL of dichloromethane was added and stirred at room temperature for 30 min, and then heated at 80° C. for 3 h to completely evaporate dichloromethane, resulting in a mixture A. The mixture A was used for preparing a first liquid crystal polymer layer for reflecting left-hand polarized light.

In a yellow light environment, 12 parts by mass of a polymerizable liquid crystal monomer HCM009, 56 parts by mass of a polymerizable liquid crystal monomer HCM008, 25.5 parts by mass of a polymerizable liquid crystal monomer HCM020, 6 parts by mass of a right-handed chiral dopant R811, 0.5 part by mass of a photoinitiator Irgacure-651, 0.005 part by mass of a polymerization inhibitor Tinuvin 328 were taken and put in a brown bottle. 4 mL of dichloromethane was added and stirred at room temperature for 30 min, and then heated at 80° C. for 3 h to completely evaporate ichloromethane, resulting in a mixture B. The mixture B was used for preparing a second liquid crystal polymer layer for reflecting right-hand polarized light.

In a yellow light environment, 15 parts by mass of a polymerizable liquid crystal monomer HCM009, 56 parts by mass of a polymerizable liquid crystal monomer HCM008, 28 parts by mass of a polymerizable liquid crystal monomer HCM020, 0.5 part by mass of a photoinitiator Irgacure-651, 0.5 part by mass of a negative dichroic dye RL002, and 0.005 part by mass of a polymerization inhibitor Tinuvin 328 were taken and put in a brown bottle. 4 mL of dichloromethane was added and stirred at room temperature for 30 min, and then heated at 80° C. for 3 h to completely evaporate dichloromethane, resulting in a mixture C. The mixture C was used for preparing a third liquid crystal polymer layer for absorbing incident laser.

The subsequent preparation procedure was substantially the same as that of Example 1, except for the followings. In this example, when preparing the third liquid crystal polymer layer, the first and second light-transmitting substrates in the liquid crystal cell were disposed in parallel with each other. The alignment layer disposed between the first and second light-transmitting substrates had an angle of 45° with respect to the first light-transmitting substrate. In addition, the first and second liquid crystal polymer layers were disposed on both sides of the third liquid crystal polymer layer respectively. The mixture B was blade-coated on the surface of the third liquid crystal polymer to prepare the second liquid crystal polymer layer, and then the mixture A was blade-coated on the surface of the third liquid crystal polymer layer way from the second liquid crystal polymer layer to prepare the first liquid crystal polymer layer. The first liquid crystal polymer layer had a thickness of 50 μm, the second liquid crystal polymer layer had a thickness of 50 μm, and the third liquid crystal polymer layer had a thickness of 45 μm. The resulted laser protective film included the first liquid crystal polymer layer for reflecting left-hand polarized light, the third liquid crystal polymer layer for absorbing incident laser and the second liquid crystal polymer layer for reflecting right-hand polarized light, which were stacked sequentially. In practical applications, the first or second liquid crystal polymer layer may be used as a layer which is directly irradiated by laser, depending on specific conditions.

In the preparation of the laser protective film given by the foregoing examples, the photoinitiator can, under UV-irradiation, initiate the free polymerization of the polymer monomers to form the polymers. In the second liquid crystal polymer layer, the molecules of the polymer formed from the polymerizable liquid crystal monomer were arranged in a right-handed spiral structure, under the action of the right-handed chiral liquid crystal monomer or the right-handed chiral dopant. Thus, the resulted second liquid crystal polymer layer can reflect right-hand polarized laser light. In the first liquid crystal polymer layer, the molecules of the polymer formed from polymerizable liquid crystal monomer were arranged in a left-handed spiral structure, under the action of the left-handed chiral liquid crystal monomer or the left-handed chiral dopant. Thus, the resulted first liquid crystal polymer layer can reflect left-hand polarized laser light. Preferably, the absorption band of the third liquid crystal polymer layer may be the same as the reflection bands of the first and second liquid crystal polymer layers, in order to effectively increase the protective angles of the first and second liquid crystal polymer layers for laser.

The following formulae can be used: $\lambda = P \times \bar{n}$ and $P = 1/HTP \times C$, in which, $\lambda$ is a wavelength of a reflection peak, P is a pitch, $\bar{n}$ is an average refractive index of materials, HTP is helical twisting capability of cholesteric liquid crystal, and C is a concentration of a chiral dopant.

According to the above formulae, the locations of the reflection peaks of the polymer layers formed by the polymerization of mixtures would be different, when the concentrations of the chiral dopant or the chiral liquid crystal monomer in the mixtures are different. Therefore, the locations of the reflection peaks of the first and second liquid crystal polymer layers can be changed by changing the concentrations of the chiral dopant or the chiral liquid crystal monomer in the mixtures. Specifically, the absorption band of the negative dichroic dye of the third liquid crystal polymer layer can be determined first, since the absorption band of the third liquid crystal polymer layer for absorbing incident laser mainly depends on the negative dichroic dye. Then, the concentration of the chiral dopant or chiral liquid crystal monomer can be adjusted according to the above formulae, such that the wavelengths of the reflection peaks of the first and second liquid crystal polymer layers may be the same as that of the third liquid crystal polymer layer.

Alternatively, the reflection bands of the first and second liquid crystal polymer layers can be determined first. Then, an appropriate negative dichroic dye can be selected, such that the absorbed wavelengths are the same as the reflection wavelengths of the first and second liquid crystal polymer layers.

In view of the above, the present disclosure provides a laser protective film has a simple manufacturing process, a large angle of protection and high flexibility. In addition, it can make modification on existing equipment and can be applied to various laser protective devices. For example, the laser protective film of the present disclosure has a good application prospect in many fields such as laser goggles, window films and the like. Further, the present disclosure provides a laser protective device, comprising any one of the above laser protective films.

Although the present disclosure has been particularly shown and described in combination with the preferred embodiments, those skilled in the art should understand that various modifications can be made to the present disclosure in forms and details without departing from the spirit and scope of the present disclosure as defined by the appended claims, and all these modifications shall fall into the scope of protection of the present disclosure.

What is claimed is:

1. A laser protective film, comprising, stackingly disposed:
    a first liquid crystal polymer layer for reflecting left-hand polarized light;
    a second liquid crystal polymer layer for reflecting right-hand polarized light; and
    a third liquid crystal polymer layer for absorbing incident laser light.

2. The laser protective film according to claim 1, wherein,
    the first liquid crystal polymer layer has a molecular arrangement of a left-handed spiral structure;
    the second liquid crystal polymer layer has a molecular arrangement of a right-handed spiral structure; and
    the third liquid crystal polymer layer has a molecular arrangement which is not parallel to those of the first liquid crystal polymer layer and the second liquid crystal polymer layer.

3. The laser protective film according to claim 2, wherein the molecular arrangement of the third liquid crystal polymer layer is perpendicular to those of the first liquid crystal polymer layer and the second liquid crystal polymer layer.

4. The laser protective film according to claim 2, wherein,
    the first liquid crystal polymer layer is formed from polymerization of a mixture A under UV irradiation, wherein the mixture A comprises a polymerizable liquid crystal monomer having a left-handed chiral liquid crystal monomer, a photoinitiator, and a polymerization inhibitor, and/or the mixture A further comprises a left-handed chiral dopant;
    the second liquid crystal polymer layer is formed from polymerization of a mixture B under UV irradiation, wherein the mixture B comprises a polymerizable liquid crystal monomer having a right-handed chiral liquid crystal monomer, a photoinitiator, and a polymerization inhibitor, and/or the mixture B further comprises a right-handed chiral dopant;
    the third liquid crystal polymer layer is formed from polymerization of a mixture C under UV irradiation, wherein the mixture C comprises a polymerizable liquid crystal monomer, a photoinitiator, a polymerization inhibitor, and a negative dichroic dye.

5. The laser protective film according to claim 4, wherein the absorption band of the third liquid crystal polymer layer is the same as reflection bands of the first liquid crystal polymer layer and the second liquid crystal polymer layer.

6. The laser protective film according to claim 4, wherein the polymerizable liquid crystal monomer comprises at least one selected from a group consisting of HCM008, HCM009, HCM020 and HCM021.

7. The laser protective film according to claim 4, wherein,
    the left-handed chiral dopant comprises at least one selected from a group consisting of S1011, S811, 55011 and S6N;
    the right-handed chiral dopant comprises at least one selected from a group consisting of R1011, R811, CB15, R5011 and R6N; and
    the right-handed chiral liquid crystal monomer comprises HCM-006.

8. The laser protective film according to claim 4, wherein,
    the photoinitiator comprises at least one selected from a group consisting of Irgacure-819, Irgacure-651, and Irgacure-369; and
    the polymerization inhibitor comprises at least one selected from a group consisting of Tinuvin 328 and O-methylhydroquinone.

9. The laser protective film according to claim 4, wherein the negative dichroic dye comprises at least one selected from a group consisting of RL002, RL013, and RL014.

10. A laser protective device comprising the laser protective film according to claim 1.

* * * * *

UNITED STATES PATENT AND TRADEMARK OFFICE
CERTIFICATE OF CORRECTION

PATENT NO. : 11,256,008 B2
APPLICATION NO. : 16/498760
DATED : February 22, 2022
INVENTOR(S) : Guofu Zhou et al.

It is certified that error appears in the above-identified patent and that said Letters Patent is hereby corrected as shown below:

On the Title Page

Item [73], delete "ELECTRONIC PAPER DISPLAY INSTITUTE"

Signed and Sealed this
Twenty-seventh Day of December, 2022

*Katherine Kelly Vidal*

Katherine Kelly Vidal
*Director of the United States Patent and Trademark Office*